United States Patent [19]

Stellberger

[11] Patent Number: 4,509,093
[45] Date of Patent: Apr. 2, 1985

[54] ELECTRONIC LOCKING DEVICE HAVING KEY AND LOCK PARTS INTERACTING VIA ELECTRICAL PULSES

[75] Inventor: Karl-Heinz Stellberger, Velbert, Fed. Rep. of Germany

[73] Assignee: Hülsbeck & Fürst GmbH & Co. KG, Velbert, Fed. Rep. of Germany

[21] Appl. No.: 512,615

[22] Filed: Jul. 11, 1983

[30] Foreign Application Priority Data

Sep. 7, 1982 [DE] Fed. Rep. of Germany ....... 3225754

[51] Int. Cl.³ ............................................ H01H 47/32
[52] U.S. Cl. ............................... 361/172; 340/825.31; 340/825.54
[58] Field of Search .............................. 361/171, 172; 340/825.31, 505, 825.54; 70/277, 278; 307/10 AT, 10 R

[56] References Cited

U.S. PATENT DOCUMENTS 3,587,051 6/1971 Hovey ............................ 361/172 X

FOREIGN PATENT DOCUMENTS

3006128 8/1981 Fed. Rep. of Germany ........ 70/278
2024914 1/1980 United Kingdom ................. 70/277

Primary Examiner—Reinhard J. Eisenzopf
Attorney, Agent, or Firm—Michael J. Striker

[57] ABSTRACT

Disclosed is an electronic locking device including electrically interacting key part and lock part each including electronic data processor with an inner code which is particular for a pair of key and lock units which belong one to another. To increase the number of variations and to inhibit the breaking of the code, the latter is generated in two stages whereby the input magnitudes for the code are retrieved from a collection of random numbers randomly generated in each unit. In the first stage of the coding process, the input magnitudes are subjected to computation according to a definite algorithm. In the second stage, only a fragment of the computation result is used and arranged according to a definite rule or formula to serve as output magnitudes for a comparator where the final arrangement of the fragments formed in respective units is tested as to mutual agreement. In the case of an agreement, a switching pulse is generated which activates bolt control mechanism in the locking unit.

10 Claims, 3 Drawing Figures

ELECTRONIC LOCKING DEVICE HAVING KEY AND LOCK PARTS INTERACTING VIA ELECTRICAL PULSES

BACKGROUND OF THE INVENTION

The present invention relates in general to electronic locking devices and in particular to a locking device of the type having pulse-operated, inductively interacting key and lock parts, the lock part being connectable to an object to be locked and including bolt means activatable exclusively in response to an assigned key part so as to move between an operative and inoperative position, at least the lock part generating, in response to a start pulse, a sequence of digital input data in the form of electrical pulses which are applied to the key part. The key part and the lock part being provided each with specific association between the unanimous input data at respective lock and key parts, and between output data in the form of electrical pulses generated by the two parts, the specific associations being relative only for the key and lock parts which belong one to another and serve as an electric code for the latter, and a common comparator arranged at least in the lock part for comparing the pulse sequences of the output data, and for generating an actuation pulse for the bolt means when the two pulse sequences are correlative or in mutual agreement.

In the known locking devices of this kind, described for example in the German publication No. 2,234,815 and in U.S. Pat. No. 3,761,892, a starting switch is provided at the lock part and after actuation of this switch an oscillator in cooperation with a counter produces all possible permutations of a number system and feeds the entire body of numbers in the form of electrical pulses to a read-only memory in the lock part and also to the memory in the interfacing key part. This sequence of pulses determines the input addresses for the two read-only memories (ROM). At these addresses, each ROM stores unambiguously output magnitudes which are applied again in the form of electrical pulses to one of two inputs of a comparator. The comparator tests the correlation of the output signals incoming from the key and lock parts and actuates the electromagnetic apparatus of the bolt means only then when the two output signals are unanimous. The specific stored information in the two read-only memories is the electrical codes for the key and lock parts which belong one to the other. This code is individual for each matching pair of the key and lock subunits and is different for all remaining pairs. The output signal from the two ROM's is also a definite number from this body of numbers.

A disadvantage of these known locking devices is the fact that the key part can be relatively easily copied. An unauthorized person, after the actuation of the start switch on the lock part, can record the entire sequence of pulses and, when he or she gains momentary access to the corresponding key part, the sequence of the output signal at the key part can also be recorded and the electronic code is thus broken. The unauthorized person thereafter can easily produce a second key. Even when using a very large "body of numbers" for the input and output signals, the safety of these known locking devices is not considerably increased and, in addition, a further disadvantage is produced due to excessive time consumption for the transfer of such long pulse sequences.

In processes for transferring data between two stations, disclosed for example in European patent application No. 0,002,580, it has been disclosed how to generate in a first station a random number from which a coded test number is derived and transferred to a second station where the decoding takes place. The communication between the two stations thus necessitates cumbersome coding and decoding operations and the application of this data transmission to electronic locking devices having individually coded key and lock parts is not advantageous.

The same is true for another known communications device described in German publication No. 2,253,275, in which the access to the device by unauthorized persons is protected in such a manner that a code word is necessary in addition to the electronic key part. In the device a group of random numbers is generated, but this group serves for the selection of a definite code on both sides. This code is used both for locking and key parts of the locking device (German publication No. 2,635,180, U.S. Pat. No. 4,209,782) where according to the law of probability the electronic code in a pair of lock and key parts is changed. When the correspondence of the code is detected during application, then a new code pair is assigned to the lock and key parts. In this case, the random number immediately produces an electronic code which, after each application is changed in the key and lock pair.

SUMMARY OF THE INVENTION

A general object of the present invention is to overcome the disadvantages of prior art electronic locking devices.

More particularly, it is an object of the invention to provide an improved electronic locking devices of the aforedescribed kind which has a high degree of safety against forcible opening.

Another object of this invention is to provide such an improved locking device in which it is difficult to copy the key part.

An additional object of the invention is to provide an improved locking device which, even when the power source in the key or lock part is temporarily disabled, the operational steps in the two parts remain unchanged and, after the restoration of the power supply, the device is functional without reprogramming.

In keeping with these objects and others which will become apparent hereafter, one feature of the invention resides in an electronic device of the aforedescribed type, in the provision of means for generating the start pulse in the key part, the input data generated in the lock part being at least one random number, two-stage coding means for generating an electronic code for correlated key and lock parts, one of the stages including means for performing in respective stages calculations according to a preset algorithm whereby the results of the calculations depend on the input random number, the other stage of the coding means including means for generating from the results of the calculations a fraction which is independent of the input random number, and means for applying the fractions from the key and lock parts as output data to the common comparator.

Due to the two-stage construction of the electronic coding means, a very large multiplicity of variations for the production of different pairs of key and lock parts is obtained, and at the same time a high security against break-up is ensured in spite of the fact that only a limited amount of input signals is used which can be quickly transmitted. The input values are namely the random numbers which are randomly retrieved from a large "body of numbers". During each application completely different random numbers are produced, so that even after prolonged and difficult study it is not possible to play through all possible input signals. It does not suffice for an authorized person to record the output signals in relation to a certain input signal, inasmuch as it cannot be estimated which random numbers and in what sequence they will be generated in the lock part after a start pulse is transmitted from the key part. Accordingly an imitated sequence of output signals applied to a lock part will with certainty be false. The signal transmissions between the key and lock parts do not also offer any conclusion with regard to the present electronic code of the locking device of this invention, and the same is true with respect to the output signals. This increased safety of the code is produced by the two-stage structure of the coding means. The algorithm of the first stage is very simple and computes according to a functional formula or equation, from each available random number which is randomly retrieved from an immense "body of numbers" a unique result of computations. This result, however, is not transmitted as such, but only a fragment thereof which in the second stage of the coding means is determined according to a preset rule or formula. This rule or formula can determine for example that only definite orders or places of the number resulting from the calculations is used as the transmitted output signal. For example, only the second, fifth and seventh places of the resulting number are transmitted, whereby the sequence of these additional digits can be subsequently changed according to a preset formula. No decoding of the output signal is needed, inasmuch as the key part pertaining to the lock part operates with the same two-stage coding means. At the comparator, only these screened output data, from which no conclusions can be drawn, are compared one with the other. If the electric power source in the key part or in the lock part is disabled, the two-stage coding means will remain unaffected, and any reprogramming in the key and lock parts is unnecessary. As soon as the electric power supply is restored, then after a repeated start signal transmitted from the key part, a new verification performed by the comparator to ascertain whether the employed key and lock parts match with one another, namely whether the codes of the two-stage coding means which are undetectable outside the device, are in mutual agreement or not. By changing the algorithm and the rule or formula for determining the fragment of the computation result, it is possible to develop a large number of well differentiated curves of key and lock parts. Consequently, the multiplicity of variations of the device of this invention is extraordinarily large.

In a further elaboration of this invention, it is possible to make the comparison of generated output signals in several consecutive working cycles, in which the aforementioned two-stage determination of output signals is included. In doing so, in each working cycle a group of random numbers is used which preferably is retrieved from a pre-arranged set of random numbers and which is composed according to a generating rule in a result signal both as to the key side and at the lock side. This generating rule offers still another element for coding an assigned pair of key and lock parts. In such multiple working cycles for the interaction between the key and lock parts, it is of advantage when, in a pre-programmed large amount of random numbers are transmitted between the key and lock parts and stored therein so that, in the subsequent process of determining the output signals, the specific random numbers are at any time available in each working cycle. In order to make decoding more difficult, it is also of advantage to generate the group of random numbers both in the key part and in the lock part independently from one another, and only thereafter communicate the information. The process in the consecutive working cycles is continued only then when in each cycle a correspondence between the output signals from the key and lock parts is detected. Where this correspondence or correlation is correct, an actuation pulse for the bolt means is produced, but this actuation or switching pulse does not act immediately on the bolt means at the lock part but, as long as the last working cycle has not been reached, the actuation pulse releases the formation of a new calculation result from a certain group of stored random numbers which will be employed for determining the output signals in the next working cycle.

Due to the succession of a plurality of working cycles an extraordinarily high degree of safety for distinguishing different pairs of key and lock parts is obtained. The comparison phase between the output signals produced in each working cycle is preferably made alternately in the key part and then in the lock part. Consequently, the interaction between the lock and key parts in consecutive working cycles is always mirror-symmetrical; at one time it is the key part which is active, and at another time it is the lock part which actively tests the incoming output signals as to their compatibility. In this manner, a particularly high degree of protection against break-ups is achieved. The safety against forcible opening or break-in can be further increased when in the consecutive working cycles the algorithm, the rule or formula for forming the computation results and the fragments of the computation results and/or the formation law for the computation signals for periodically changed. In this manner, the decoding of the locking device of this invention is rendered extremely difficult for unauthorized persons.

In order to still increase the safety against unauthorized opening, it is advantageous to disable the key and/or lock part for a certain time period in the case where, in the preceding working cycle, no agreement between the output signals applied to the key and lock parts has been detected. No subsequent working cycle is any longer initiated. The bolt means become controllable only after the expiration of this time period. In this way it is prevented that, in order to break up the code of the locking device, a multitude of probe signals be transmitted to the locking part. As soon as an error occurs, the bolt means is blocked and stops to operate.

The interface or communication between the key part and the lock part can be established by a direct contact through which the electrical pulses are transmitted. Nonetheless, it is recommended to transmit the pulses by radiation, because this communication is not susceptible to mechanical wear.

The locking system of this invention is also readily applicable in hieratically organized locking systems using superordinate and subordinate key and lock parts, for example master and slave keys. In this case, one proceeds such that all key and lock parts have the same algorithm but a subordinate key or lock part distinguishes over the superordinate counterpart by using a shorter fragment in the output signal to be compared in the comparator. The general master key part and the corresponding lock part deliver therefore the full number of fragments of the computation result in the output signal. The more subordinate a key or lock part is, the shorter are the fragments transmitted as output signals which are to be compared.

The novel features which are considered characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENTS

The electronic locking device consists of a key part 10 and a lock part 20. Both parts 10 and 20 include microprocessors 11 and 21 each connected to a fixed store or read only memory (ROM) 12, 22 and to a random-access memory 13, 23, the latter serving for receiving intermediate results. Power supply for these component parts is not shown in the diagram and can be of any suitable kind, such as a battery cell or the like. Both the key unit 10 and the lock unit 20 include a random number generator 14, 24 connected via conduits 15, 25 to an assigned microprocessor 11, 21 and via conduits 16, 26 to an interface or communication member 17, 27. The communication members 17, 27 may interact either by a direct contact or, as indicated in this example, they can be designed as radiation transmitter and receiver for alternately transmitting and receiving electromagnetic radiation, preferably infrared radiation. If desired, another kind of radiation is applicable, for example an ultrasonic radiation. The communication members 17 and 27 enable a data exchange between the key unit 10 and the lock unit 20, namely the transmission of an interrogation signal and of a response signal which when compared will detect whether an employed key unit 10 is in agreement with the employed lock unit 20. For safety reasons, the same check out or information exchange is made also at the key unit, and this check out signal exchange can be repeated several times in order to achieve a high degree of safety. The individual transmission parts of the interrogation and response signals passing through the space between the communication members 17 and 27 are indicated in FIG. 1 as well as in the flowcharts in FIGS. 2 and 3 by undulating lines 30.

The lock unit 20 is secured to an object to be locked, for example a door 31 of a motor vehicle. The key unit 10 has a convenient size matching the pocket, so that it can be readily carried by the user. To initiate the interaction between the key unit and the lock unit, the key unit 10 is provided with a trigger element 19 manually controlled by a handle 18. The trigger element 19 is connected to the random number generator 14 and to the microprocessor 11. In the event that the key and lock units 10 and 20 are in agreement with one another, as will be described in greater detail below, then the microprocessor 21 at the lock unit 20 transmits via conduit 28 a start signal to a switching member 29, which renders via a conduit 32 a bolt setting mechanism 33 which in turn moves a bolt 35 into its operative or inoperative position as indicated by arrow 34. In the illustrated extended or operative position, the bolt 35 engages an opening 36 in metal plate 37 which is secured in the frame of the door. Accordingly, the door 31 is in its closed condition. By the effect of the correct key unit 10, the switching unit 29 emits a switching pulse which is transmitted via conduit 32 in the direction of arrow 38 to the setting mechanism 33 which is thus activated to withdraw the bolts 35 from the opening 36 in the holding plate 37. The locking device is thus brought into its open condition, in which the door 31 can be opened.

Figure 1:
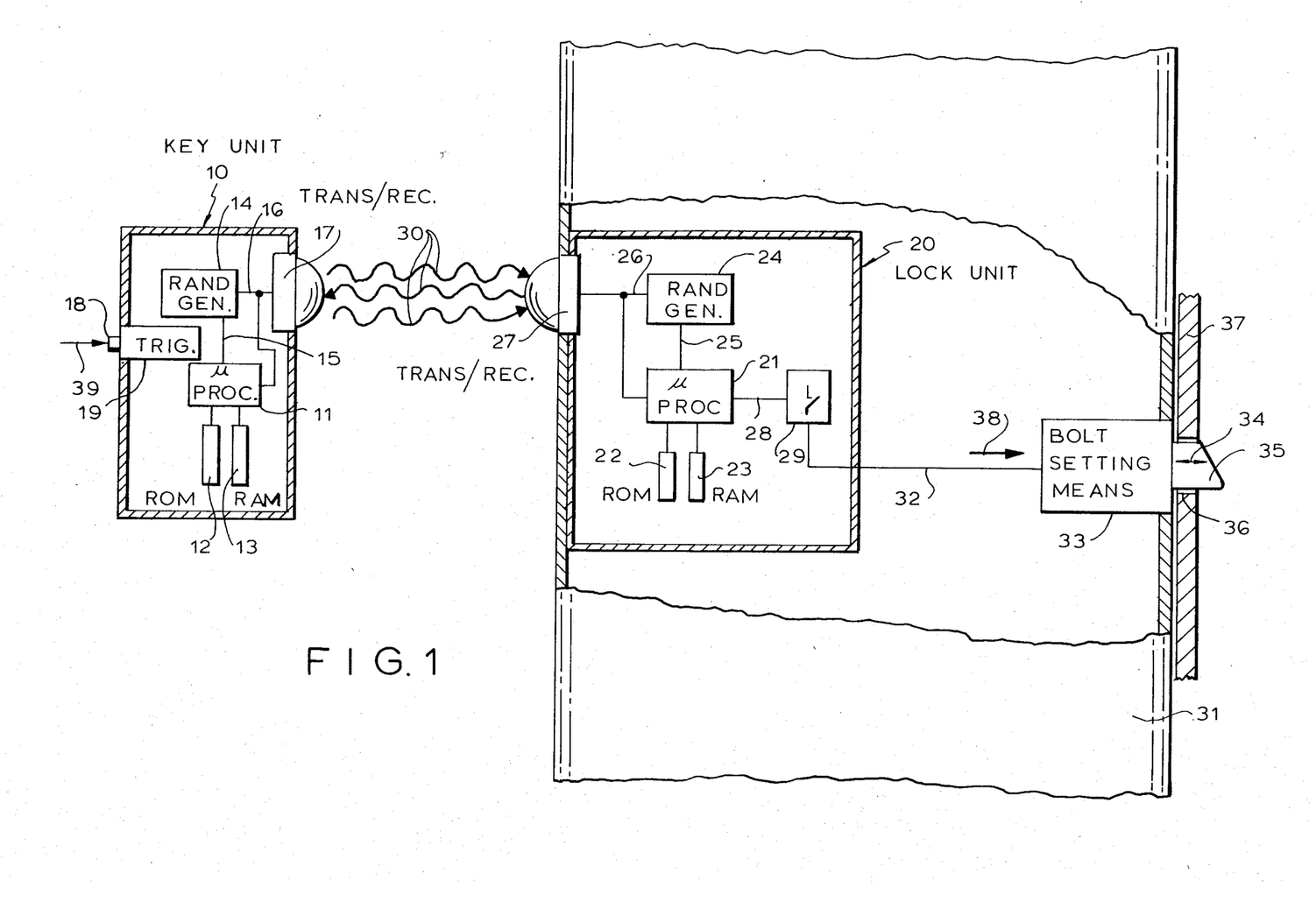
FIG. 1 is a schematic illustration, partly in a cut away view, of the locking device of this invention.

After the withdrawal of the bolt 35 in response to the switching pulse 38, the bolt is automatically moved by a resetting spring or the like into its closing position, indicated in FIG. 1. Of course, it is also possible to use a bolt setting mechanism 33 which, for the changeover of the bolt 35 from its aforementioned releasing position into the closing position, requires another switching pulse 38 transmitted by a repeated interaction between the key and lock units 10 and 20. It will be understood that for this purpose any conventional bolt setting mechanism with known arrangement of locking elements such as for example fork-like drop-bolt locks as used in motor vehicles, can replace the bolt 35.

Figure 2:
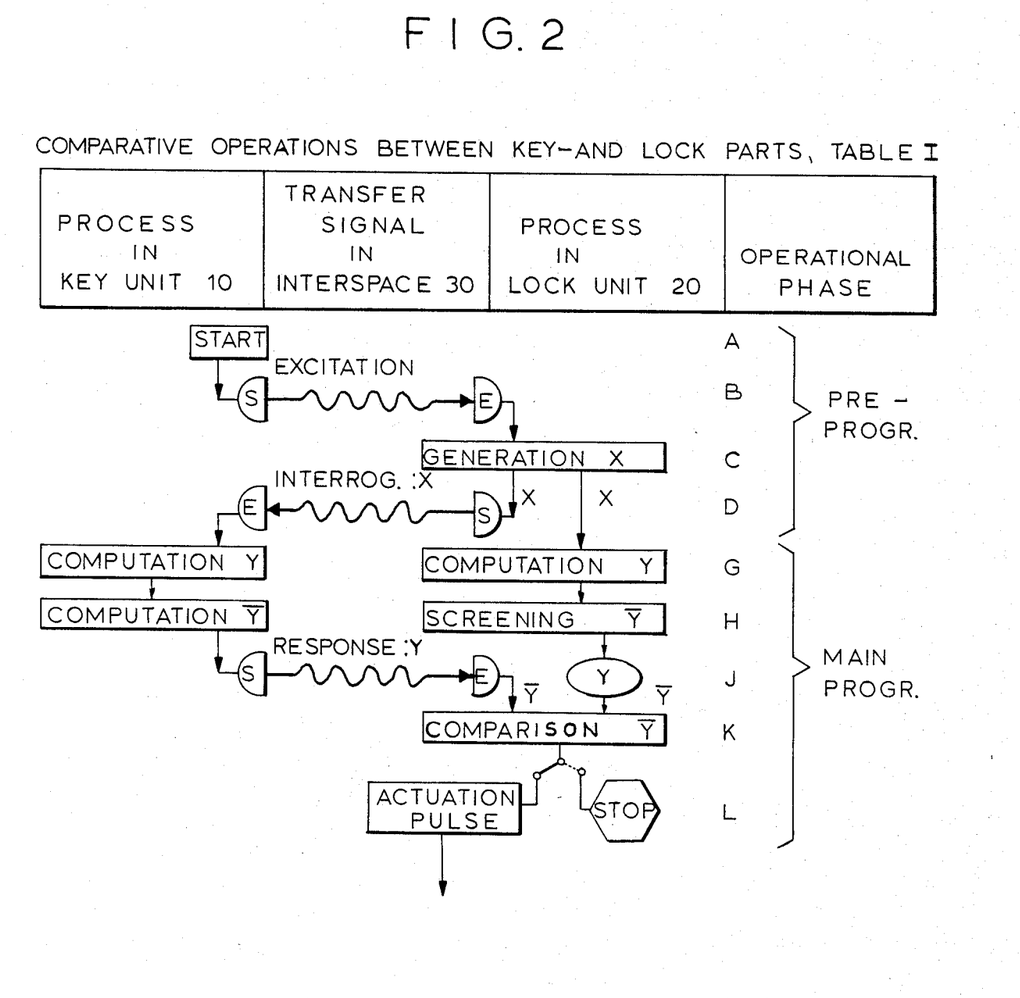
FIG. 2 is a flowchart of a comparison program of a first embodiment of the device of this invention.

The mode of operation of this invention is explained in principle in flowchart I in FIG. 2. The information flow, viewed from above downwardly, illustrates in a time sequence the processes which take place in key unit 10, the interspace 30 and the lock unit 20 as viewed from the left to the right and indicated in the headings. The right-hand column indicates the operational phases of working process indicated schematically in the remaining columns. The corresponding separation of used programs will be referred to in the below described flowchart II of FIG. 3. To facilitate the comparison between the two flowcharts I and II, the operation phases in flowchart I are designated by reference letters which are not arranged in continuous alphabetical order. In the flowchart II there are indicated two additional processes for which the missing reference letters in flowchart I are reserved.

In the following description, the processes pertaining to individual operational phases of the locking device of FIG. 1 are indicated with reference to the flowchart I:

(A) Triggering:

By pressing the start control handle or pushbutton 18 in the direction of arrow 39, the control program stored in the store 12 of the microprocessor 11 starts running.

(B) Start-communication:

The communication transceiver 17 of key unit 10 transmits a start pulse which is received by the communication transceiver 27 at the lock unit and actuates microprocessor 21 of the latter, so that control programs stored in the memory 22 is initiated.

Figure 3:
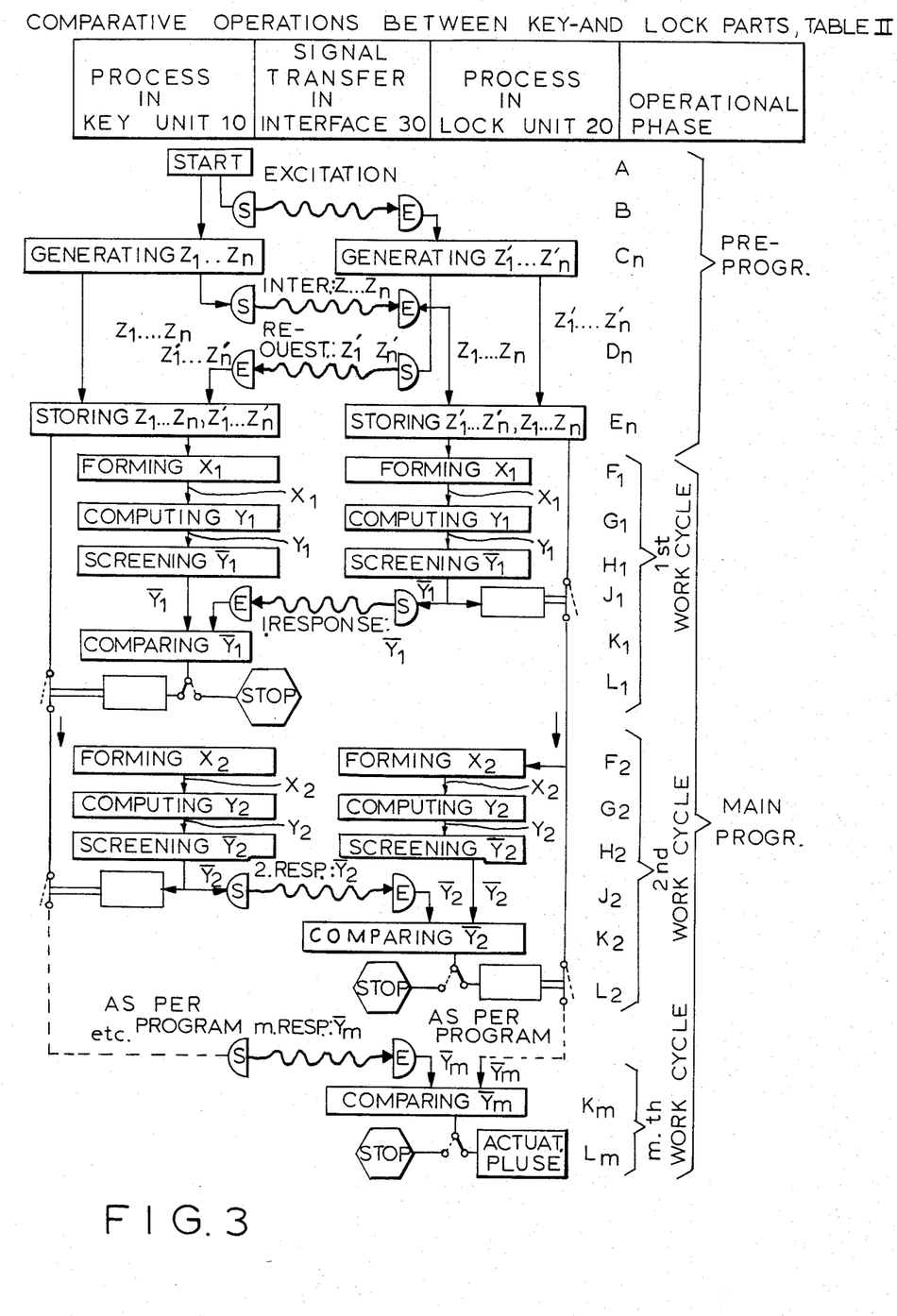
FIG. 3 is a flowchart of another, modified embodiment of the device of this invention.

(C) Generation:

Random number generator 24 provided in the lock unit generates an arbitrary but in individual cases definite random number x which serves as an input signal, for example $x = 438$. If desired, the similar generation process can take place also in the key unit 10, as will be explained in greater detail in connection with flowchart II.

(D) Interrogation:

The communication transceiver 27 of the lock unit now acts as a transmitter and transmits the input signal x to the communication transceiver 17 at the key unit, which now acts as a receiver. In this example, the transceivers 17 and 27 operate with infrared radiation 30. At this point the preliminary or control program is completed, and the actual main program, which includes the two-stage coding, is initiated.

(G) Computation Phase:

Starting from the random input signal x, each unit of the device, that is the key unit and the lock unit, computes in a first stage, from the random input signal x, on the basis of functional equation $y = f(x)$, which is the same for both units and which represents the algorithm for the computing operation in this first stage, the corresponding dependent variable y. This functional equation is a first code which in this first computation stage serves for the individualization of respective pairs of key and lock units which belong one to another and distinguishes the same with respect to other key and lock pairs. For example, if the functional equation is $y = 4\sqrt[3]{x} + 1.507$, then when $x = 438$ for example, the computation result in this first stage is $y = 6.08176$.

(H) Screening Phase:

In the next stage, a fragment y' is determined from another formula or rule which is the same both in the key unit and the lock unit, from the result y of computation in the first stage. This fragment y' now serves as a starting signal for further processing. The formula or rule is so selected that the result y of preceding computation cannot be derived therefrom, and that no conclusions with regard to calculation operations in the preceding first stage can be drawn. In the present case, this formula or rule provides for the selection of second, third, fourth and fifth places after the decimal point in the computation result y, and the digits on the selected places or orders are used as the output signal y'. Accordingly, in this example $y' = 8176$.

(J) Response:

While the output signal y' derived in the lock unit is momentarily stored in store 23, the corresponding output signal 1' determined in the key unit is transmitted as a response via the two communication or transceiver members 17 and 27 to the lock unit 20.

(K) Comparison:

In the lock unit 20, the output signal y' produced in the key unit is verified as to its identity with the output signal y' produced in the lock unit. For this purpose a comparing member can be used which, depending whether the two output signals y' are in agreement with one another or not, delivers two alternative commands, namely:

(L) Selection Process:

In the case of non-identity of the two output signals, the output from the comparing member selects the path indicated by dash-dot line position of a symbolic switch indicating that any further comparison program at the lock unit is interrupted, preferably for a certain time interval, for example for 30 seconds, during which the microprocessor 21 resets itself into its starting condition. During this time interval, the lock unit 20 does not respond in any way to the pulses transmitted from the key unit. If desired the electronic circuits at the lock unit can be switched off permanently instead of temporarily, so that any further manipulation with the lock unit which is evidently made for breaking up its code, is no longer possible. In this case the lock unit 20 can be reset to its normal working condition only after special measures performed by authorized service personnel who make it possible that the pulses emitted by the key unit are again receivable at the lock unit.

On the other hand, when the two units agree with one another, that is when both output signals y' are identical, then the symbolic switching member 29 is in a position in which it releases an actuation pulse 38 which in the simple embodiment of the device of this invention immediately serves for the changeover of the bolt 35 at the lock unit. As soon as the position of the bolt is changed, the main program according to the flowchart I is completed.

In order to obtain a higher degree of safety against unauthorized opening of the locking device of this invention, the actuation pulse may serve as a triggering pulse for a new working cycle between the key and lock units, which may restart the program which flows mirror-symmetrically with respect to that as indicated in flowchart I. In this case, the key unit 10 is restimulated via the communication transceiver units 17 and 27 so that a further random number be generated which in the next working phases, which are analogous to C through L, undergoes the corresponding processing, which now flows in a mirror-symmetrical fashion between the key part and the lock part. In other words, the key part 10 is now the active unit, whereas the lock unit operates in response to its commands. For example, the key unit transmits in accordance with the working phase C the newly generated random number as an interrogation signal to the lock unit, so that at both units, according to phases G and H, the computing operations are performed and, according to J, a response from the lock unit arrives at the key unit, whereby the comparison of the two output signals is, in this modification, performed at the key unit. Then, depending on the outcome of the comparison, a stop signal is generated at the key unit when the comparator finds disagreement between the exchanged signals or, in the event that the output signals are identical, the key unit generates an actuation signal for continuing the working cycles in accordance with the flowchart I. After a number of working cycles, when all comparison results are in agreement, the final actuation pulse is produced in the lock unit 20, which actuates the changeover in the control mechanism 33 and 34 of the lock unit 20.

Flowchart II in FIG. 3 illustrates a program including the aforementioned plurality of working cycles and which ensures a particularly high diversity of variations in the construction of key and lock units and, at the same time, a high degree of safety against unauthorized opening. In flowchart II, the working phases corresponding to those in flowchart I are indicated by like reference characters, which are provided with indices indicative of the working cycles. The flowchart II indicates, additionally to the embodiment of flowchart II, the following particular mode of operation:

The first two working phases (A) and (B) are in principle the same as those in flowchart I, and only the subsequent phases of the pre-program has the following deviations:

(Cn) Generation:

In this embodiment a large collection of random numbers z1 to zn is generated in random number generator 14 in the key unit, and an additional independent collection of random numbers Z1' to Zn' is generated in random number generator 24 in the lock unit.

(Dn) Interrogation and Request:

Using communication or transceiver member 17 or 27 the key unit 10 and lock unit 20 exchange the information regarding the generated random numbers, which serve as input signals, the exchange being performed as an interrogation signal from the key unit unit 10 to the lock unit 20 and as a request signal from the lock unit 20 to the key unit 10.

(En) Storing:

Both collections of input magnitudes $z1$ through $Zn'$ at respective key and lock units are stored at each unit in stores 13 and 23 for use in the main program according to which several working cycles will occur.

The aforementioned exchanges of interrogation and request signals between the key and lock units 10 and 20 do not reveal any information about the individual coding of the assigned pair of key and lock units. No decoding can be made also in the different following working cycles, because in each working cycle indicated by a corresponding index, there are performed, up to the first working phase, the same processes indicated and described under corresponding reference characters in the preceding flowchart I. In particular, (F1) Generation of the First Computation Result:

From stores 13 and 23 pertaining to respective key and lock units 10 and 20, one or more random numbers are retrieved in identical manner on either side, and these random numbers are combined to the first computation result $x1$ formed according to the same composition law. This composition law is stored in the form of a program in the fixed stores 12 and 13 which is an individual part of the code which individualizes the assigned pair of key and lock units 10 and 20 with respect to all remaining pairs of these units. In the example of flowchart II it is assumed that the illustrated key and lock units belong to one another, and consequently the same computation result $x1$ is formed at either unit of the locking device.

In the following working cycles, G1, H1, there occur the same processing steps with respect to the computation result $x1$ as in the corresponding working phases which have already been described in detail in connection with flowchart I. Therefore, there results (J1) First Response:

Lock part 20 communicates via the transceiver members 27, 17 to the key part 10 its output value signal $y'1$. This information can be immediately used at the lock unit without waiting for the subsequent comparison result, for withdrawing from the store at the lock unit a subsequent group of random numbers for the next working cycle, as indicated by the symbolic switch sign and as will be explained in greater detail below.

(K1) Comparison:

Thereafter, a comparison is made between the output value signals $y'1$ from the two units of the device. The comparison takes place in the first working cycle K1 and causes the aforementioned selection of alternatives in the working phase K1.

(L1) Selection Process:

In the case of disagreement between the output value signals $y'1$ a stoppage of the working process at the lock unit will occur, whereas in the case of an agreement the same group of random numbers, corresponding to that retrieved in the previously described phase J1, is retrieved from store 13 in the key unit and supplied for further comparison.

It will be seen from flowchart II that the subsequent operational steps designated by reference characters F2 to L2 will flow to complete the full working cycle. In these operational phases, processes take place as described in the preceding working cycle and leading to the formation of a corresponding computation result $x2$ at either unit (operational phase F2) and in the subsequent operational phases G2 and H2 the corresponding output value signals $y'2$ are developed. The second working cycle proceed analogously but in mirror-symmetrical fashion with respect to the processes in the preceding working cycle. Providing that in the first working cycle a first response from the lock unit 20 was transmitted to the key unit 10 in the operational phase J1, in the subsequent operational phase J2 the second response from the key unit 10 to the lock unit 20 will follow in the second working cycle. The secondary response is to be considered a reaction to the preceding exchange of interrogation and request signals in the operational phase Dn of the pre-program. If after the comparison in the operational phase K2 a disagreement between the output signals is detected at the phase L2 the main program is interrupted. This disagreement occurs when a false key unit is applied, since in this case no or a false first response is transmitted in the operational phase J2, even if at the lock unit the main program has been correctly performed. As described before, the operability of the locking device can be temporarily disabled for a certain period of time, the pair of key and lock units pertaining one to another can be additionally individualized relative to all other pairs by providing, apart from the aforementioned correspondence of the formation law for the output magnitudes $x1$ or $x2$, additional specific function equations and screening rules during the operational phases G1, H1 or G2 and H2. In general, it will suffice to use the same computing operations for each of the working cycles in the whole comparison process; nevertheless, if it is desired to further individualize this pair of key and lock units, in the subsequent working cycles it is possible to introduce different formation laws, function equations and/or screening rules while maintaining within a working cycle of either unit the same algorithm.

These working cycles can be mirror-symmetrically alternated in the manner described before, whereby after each working cycle a response is transmitted between the key unit and the locking unit and will be employed for comparison of the two units. For this purpose, there are always employed different groups of random numbers $z1$ through $zn$ and $Z1'$ to $Zn'$, retrieved from the large collections stored in respective stores 13 and 23. The flowchart II illustrates that there are altogether m responses during m working cycles. If agreements between these signals are continuously detected up to this end phase, then the comparison in the last comparison phase Kn is positive and produces in the phase Ln a switching pulse which activates the changeover in the setting mechanism 33 and of the bolt 35 in the lock unit 20. As a consequence, the comparison process is completed. The pair of assigned key and lock units is now ready for a new interaction, which again is initiated by the preliminary program.

The transmitted responses $y'1$ through $y'n$ do not give any clue how the algorithms of the program in operational phases F1, G1 and H1 individuate the corresponding pairs of key and lock units. It cannot be recognized on which computation values $xm$ the particular response $y'n$ relates. It is true that during the transfer the random numbers $z1$ through $Zn'$ can be detected; nevertheless, it cannot be recognized how these numbers have been united within the electronic circuits of key and lock units to produce the aforementioned computation results xm and also which groups of numbers have been withdrawn from the very large collection of random numbers. Therefore, there is no outset or starting point for decoding the signals characteristic for the particular pair of key and lock units. The key unit cannot be copied, and also the interplay between the key and lock units does not offer any starting points for decoding the matching locking device.

In a modification of the locking device of this invention, there is a possibility to use the same in systems having key units which are capable of releasing different functions, for example in locking devices for motor vehicles having normal key units and special key units. In the case of special key units, it is possible to provide a screening subsequent to operational phase H of flowchart I or II, which passes all information about the end output signal, whereas in the case of a normal key unit only selected orders or places or digits are passed. The same screening facility is available at the lock unit, whereby in the subsequent comparison phase in the lock unit, running according to K in flowchart I, the two alternatives are still produced for the two different keys. The response from the key unit which is analogous to phase K of flowchart I is first applied to a first comparison member. In the event of an agreement with the response signal of a correctly applied special key unit, the first comparison member generates a corresponding actuation pulse for the special function in the key unit, whereas in the case of a disagreement the interrogation is directed to another comparison member which compares the arrived response signal with the screened signal of the end value at the lock unit which is available for the correct normal key unit. If such a normal key unit is actually used, then the agreement of the signals under comparison is detected, and an actuation pulse for the function of the normal key unit is triggered and releases the position switching movements in the lock unit. If, however, even in this case no agreement has been found, then in accordance with the operational phase L in the flowchart I, the stoppage of the comparison process takes place, at least for a preset time interval.

In this manner it is also possible, by means of correspondingly diversified screening of the end value, to use more than two key units in a locking system which are recognized by a lock unit and are designed for releasing different functions in the lock. For example, in the case of a motor vehicle, such modified locking device can be used with advantage when several persons alternate in driving the same car, whereby the lock unit is connected for controlling additional adjusting functions in the car. For instance, each user has a special key unit belonging to the lock unit in the car, and pre-programmed in such a manner as to perform different switching functions in the lock unit, such as for example the adjustment of the back mirror, of the outer mirrors, the height of seats, the seat position, and/or the position of the backrest, so that after opening of the door the aforementioned positions are automatically adjusted to the individual needs of the user. In this way, the motor vehicle always meets the requirements of the particular user. By using different screening patterns, a large number of different key units can be used for the same lock unit to control a large diversity of switching functions.

In addition, the locking device of this invention is applicable also for locking systems having a hierarchical arrangement of key and lock units, namely superordinate and subordinate units as has already been discussed above. In the simple case of such a hierarchic system, the same algorithm is used for all key units, but the computation result is screened as a function of the hierarchic position of the key or lock unit. The more superordinate a key is, the smaller is the screening. The general main key unit in this case is completely without any screening. At the side of the lock unit, the situation is reversed, that is the more alternative screens are needed for the output value signals y' after the operational phase H of flowchart I, the more subordinate is the lock unit, inasmuch as it has to cooperate with a number of equally subordinate and superordinate key units. In the comparison phase analogous to K in flowchart I all alternative screenings for the lock unit are considered before in the end phase L it is decided, when no argeement is detected, to stop the comparison process or when one of the aforesaid possibilities is in agreement with response signal y' from the lock unit and therefore a switching pulse is released to change over the position of the arresting means at the lock unit.

In a modification of the preceding example, it is also possible in a hierarchy of key and lock units to provide different algorithms for different key units. In this case, the lock units contain the algorithms of all applicable key units, and during operation the lock unit verifies whether an agreement with the algorithm of the particular key is present or not, whereupon again the two alternatives for activating or not activating of the arresting means at the lock unit, are processed in the same manner as in the preceding examples.

It will be understood that each of the elements described above, or two or more together, may also find a useful application in other types of constructions differing from the types described above.

While the invention has been illustrated and described as embodied in specific examples of the electronic locking device, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. An electronic locking device of the type having pulse-operated interacting key and lock units each including a random number generator, data processing means connected to the random number generator and communication means connected to the random number generator and to the data processing means, the lock unit being connectable to an object to be locked and including a bolt control means which in response to an assigned key unit moves between an operative and an inoperative position, at least the lock unit generating, in response to a start pulse, a sequence of digital input data in the form of electrical pulses which are transmitted to the key unit, the key and lock units being preprogrammed respectively for a specific association between the unanimous input and output data generated at each unit, the two specific associations being in tune only for key and lock units which belong one to another, whereby the tuned up associations serve as an electric code for the units, a common comparator arranged at least in the lock unit for comparing the pulse sequences of the output data and for generating an actuation pulse for the bolt control means when the two pulse sequences are in tune, comprising means for generating a start pulse at the key unit;

said input data being at least one randomized random number;

two-stage coding means for generating an electronic code characteristic of the associated pair of key and lock units, one coding stage including means for performing in each unit computations according to a preset algorithm whereby the resulting values of these computations depend on the input random number, the other stage of the coding means including means for generating from the results of the computations in the first-mentioned stage a fragmented number derived according to a preset formula or rule which is independent from the input random number; and means for applying the fragmented numbers generated at respective key and lock units as said output data to said common comparator.

2. A locking device as defined in claim 1, wherein each of said data processing means is preprogrammed so that the key unit generates its own collection of random numbers and the lock unit generates another collection of random numbers which is independent from the first-mentioned collection; each of said communication means including a transceiver for exchanging information about generated collections between the key and lock units, and means for storing the generated and the exchanged random numbers;

said data processing means being further programmed for retrieving from the stored collections groups of random numbers which are in mutual agreement in each unit, and means for combining each group according to an identical formation law or formula into computation factors which are taken as a basis for computations at each of said units.

3. A locking device as defined in claim 2, wherein the program of each of said data processing means in key and lock units performs a plurality of similar consecutive working cycles which run in each unit independently from the other unit and each including two-stage operations, namely a determination phase which determines the output magnitudes, and a comparison phase which is common to both units and which detects whether the output magnitudes of respective units are in mutual agreement;

means for releasing at the end of a working cycle, in response to the agreement of the output magnitudes, a switching pulse which initiates the formation of a new computation factor from another group of stored random numbers used for the next working cycle and the switching pulse generated in the last working cycle activates the bolt control means in the lock unit.

4. A locking device as defined in claim 3, wherein the working cycles follow alternately in a mirror-like fashion between the key and lock units, the comparison phase for output magnitudes of both key and lock units taking place in consecutive working cycles alternately in the key unit and the lock unit, whereby in the other unit during the determination of the output magnitude the new computation factor for the next working cycle is formed and the new working cycle is initiated independently from the comparison result.

5. A locking device as defined in claim 3, wherein in each working cycle in respective units the same algorithm of the programs is present, this algorithm being periodically changed in similar fashion both in the key and the lock unit.

6. A locking device as defined in claim 3 having a plurality of superordinate and subordinate key and lock units, wherein all key and lock units have the same algorithm for the determination of the output magnitude in the first stage, and the subordinate key and lock units in the second stage of the determination phase determine and compare less fragments of the computation results than the superordinate key and lock units.

7. A locking device as defined in claim 3, including a plurality of superordinate and subordinate key and lock units, wherein the different key units used during the determination of the output magnitudes, different algorithms and/or rules for the formation of fragments of the computation results, and the lock units include the algorithms and/or rules of all pertaining key units so as to compare and verify during the comparison phase the compatibility of said key units.

8. A locking device as defined in claim 3 further comprising means for inactivating the key part and/or the lock part in response to the disagreement between the output magnitudes during the comparison phase.

9. A locking device as defined in claim 1, wherein the communication means transmit the electrical pulses between the key and lock units by direct contact.

10. A locking device as defined in claim 1 wherein the communication means include transceivers operating with radiation, for example inductively by electromagnetic waves.

* * * * *

UNITED STATES PATENT AND TRADEMARK OFFICE
CERTIFICATE OF CORRECTION

PATENT NO. : 4 509 093
DATED : April 2, 1985
INVENTOR(S) : Karl-Heinz Stellberger It is certified that error appears in the above—identified patent and that said Letters Patent is hereby corrected as shown below:

On the title page;

[30] The priority date should read
--July 9,1982 --

Signed and Sealed this

Tenth Day of September 1985

[SEAL]

Attest:

DONALD J. QUIGG

Attesting Officer     Acting Commissioner of Patents and Trademarks - Designate